United States Patent [19]
Usami et al.

[11] Patent Number: 5,879,132
[45] Date of Patent: *Mar. 9, 1999

[54] STAINLESS STEEL TYPE 13CR5NI HAVING HIGH TOUGHNESS, AND USAGE OF THE SAME

[75] Inventors: Kenichi Usami, Hitachi; Hiroshi Takayasu, Ibaraki; Tsutomu Onuma, Hitachi; Makoto Kanda, Ibaraki; Masao Kawakami, Hitachinaka; Fumio Sakamoto, Ibaraki; Tsugio Fushimi, Hitachinaka; Tsugio Yoshikawa, Hitachi, all of Japan

[73] Assignee: Hitachi, Ltd., Japan

[ * ] Notice: This patent issued on a continued prosecution application filed under 37 CFR 1.53(d), and is subject to the twenty year patent term provisions of 35 U.S.C. 154(a)(2).

[21] Appl. No.: 749,323

[22] Filed: Nov. 14, 1996

Related U.S. Application Data

[62] Division of Ser. No. 492,449, Jun. 19, 1995, Pat. No. 5,601,411.

[30] Foreign Application Priority Data

Jun. 17, 1994 [JP] Japan .................................. 6-158247
Jul. 27, 1994 [JP] Japan .................................. 6-175114

[51] Int. Cl.⁶ .................................................. F04D 29/38
[52] U.S. Cl. ..................................... 416/223 R; 415/200
[58] Field of Search ........................... 416/241 R, 223 R; 415/200

[56] References Cited

U.S. PATENT DOCUMENTS

| | | | |
|---|---|---|---|
| 4,499,158 | 2/1985 | Onuma et al. | 416/241 R |
| 4,795,313 | 1/1989 | Coulon | 416/224 |
| 4,837,384 | 6/1989 | Khan et al. | 148/404 |
| 4,850,187 | 7/1989 | Siga et al. | 60/39.37 |
| 5,008,072 | 4/1991 | Siga et al. | 420/69 |
| 5,030,064 | 7/1991 | Usami et al. | 415/200 |
| 5,035,579 | 7/1991 | Yada et al. | 416/241 R |
| 5,403,546 | 4/1995 | Khan et al. | 420/448 |

FOREIGN PATENT DOCUMENTS

| | | |
|---|---|---|
| 42-16870 | 9/1942 | Japan . |
| 42-24813 | 11/1942 | Japan . |
| 58-37162 | 3/1983 | Japan . |
| 60-63357 | 4/1985 | Japan . |
| 60-174859 | 9/1985 | Japan . |
| 62-54863 | 11/1987 | Japan . |

Primary Examiner—John T. Kwon
Attorney, Agent, or Firm—Evenson, McKeown, Edwards & Lenahan, P.L.L.C.

[57] ABSTRACT

An ultra high head pumpturbine power generating plant with a turbine having a runner rotating with water flow supplied through a high head conducting tube. A rotary electric machine rotates with rotation of the runner. The head is in the range of 400–600 m, and the runner is at least 5 meters in diameter. The said runner has characteristics of toughness at room temperature: at least 500 N/mm², or tensile strength at room temperature: at least 650 N/mm², elongation at least 16%, reduction of area at least 45%, 2 mm U-notch impact value at 0° C. at least 100 J, and fracture toughness at least 6000 N/mm³ᐟ².

15 Claims, 9 Drawing Sheets

5,879,132

STAINLESS STEEL TYPE 13CR5NI HAVING HIGH TOUGHNESS, AND USAGE OF THE SAME

This is a Divisional of application Ser. No. 08/492,449, filed Jun. 19, 1995, now U.S. Pat. No. 5,601,411.

BACKGROUND OF THE INVENTION

1. Field of the Invention

The present invention relates to novel stainless steel type 13Cr5Ni, and the usage of the same in fluid machinery such as hydraulic turbine runners and guide vanes, which are assembled into a hydraulic turbine generator or a pumped-storage hydraulic turbine generator, and impeller for a pump, and fluid machinery made of 13Cr containing Ni martensitic stainless steel which has previously been cladded by welding with welding material having corrosion resistance and welding crack resistance at portions of the machine where cavitation erosion is anticipated.

2. Description of the Prior Art

As JP-B-42-16870 (1967) disclosed, stainless steel type 13Cr5Ni contains approximately 30% austenite in a martensitic matrix, accordingly, stainless steel type 13Cr5Ni has both the large strength of martensitic steel and the high toughness of austenitic steel. Stainless steel type 13Cr5Ni has significantly better weldability than 13Cr steel which does not contain Nickel. However, the welded portions without any annealing treatment have a ductility and toughness lower than the base materials because of hardening of the heat affected zone.

For fluid machinery, material having a large strength and a high toughness is required in order to restrict the cross sectional area of machines to increase fluid flow rate and efficiency. Stainless steel having preferable toughness were disclosed in JP-A-60-63357 (1985) and JP-A-60-174859 (1985).

Hydraulic turbine machines exposed to high speed rotation and rapid fluid flow in fresh water and sea water generate cavitation at local portions which would cause vibration and noise, and decrease efficiency. Further, the surface of the local portions would be damaged by cavitation erosion. Therefore, the use of 13Cr cast steel containing nickel having more preferable erosion resistance and desirable strength characteristics than conventional material is becoming widespread as a material for runners of hydraulic turbines which are large scale apparatus. However, the hydraulic turbine machine is still damaged by erosion depending on the scale or operating condition such as speed of rotation, and consequently, the development of a repairing technique is desired.

Generally, an erosion resistant welding material for suppressing the above damage, a cobalt base alloy, called stellite, containing Cr, Ni, Mo, and others which are standardized in JIS:Z3251 and AWS:A5.13, is well known. However, the above welding material is expensive because it includes a large amount of cobalt, and further, its cladding layer has a high carbon content (0.90–3.00%) and a high hardness (Vickers hardness; 400–550). Accordingly, when the cladding area is broad, weld crack sensitivity increases and workability at the surface of the cladding layer becomes difficult. Therefore, because of the weld crack sensitivity, pre-heat treatment and post-heat treatment at a high temperature (550°–650° C.) is applied to the cladding layer even if an intermediate cladding layer of austenitic welding material is provided at the surface of the base material.

Accordingly, there are many problems in assuring the safety of workers when performing welding repairs in a narrow place on a machine, and many issues concerning workability and lowering cost remain.

Therefore, because of the above reasons, austenitic welding material such as D(E)-308, D(E)-309, D(E)-309Mo which are standardized in JIS: Z3251 and AWS: A5.4 are mainly used in welding repairs of parts of such hydraulic turbines, because, although the above material is inferior in erosion resistance to the cobalt base alloy group welding material, the material has a low pre-heating temperature, preferable weld crack resistance, and a relatively low price. JP-B-42-24813 (1967), JP-A-58-37162 (1983), and JP-B-62-54863 (1987) disclose such cladding weld materials.

However, the above conventional welding repair materials have many issues to be solved such as the incapability of realizing sufficient resistance against damage to fluid machines by cavitation and soil under severe operating conditions such as with large scale machines and increasing speeds of rotation. Further, usage in corrosive environments such as sea water is desired, and accordingly, development of materials which resist erosion in addition to corrosion and abrasion is required.

Therefore, surface treating weld cladding materials for suppressing damage of the composing parts of fluid machinery such as hydraulic turbines by cavitation and soil as described above, having better resistance against both erosion and corrosion, and superior weldability are desirable.

SUMMARY OF THE INVENTION

Objects of the Invention

Although all the materials disclosed in the above prior art indicate high strength, the materials do not have sufficient high toughness and high weld crack resistance required for high stress bearing materials of high head hydraulic generators.

Therefore, the first object of the present invention is to provide stainless steel type 13Cr5Ni having a large strength and a high toughness, fluid machinery using the same, and ultra high head pumped-storage hydraulic power plant using the same.

The second object of the present invention is to provide fluid machinery wherein cladding layers are formed with austenitic material having improved workability and preferable erosion resistance, abrasion resistance, and weld crack resistance which are intended to improve corrosion resistance, to stabilize the structure, and to make the grains in the structure fine, and an ultra high head pumped-storage hydraulic power plant using the same.

Methods for solving the Problems

In order to achieve the above first and the second objects of the present invention, stainless steel type 13Cr5Ni comprising:

C: 0.008–0.03% by weight,
Si: 0.05–0.6% by weight,
Mn: 0.1–2.0% by weight,
Cr: 11.0–14.0% by weight,
Ni: 4.0–7.0% by weight, and
Mo: 0.2–2.0% by weight, and
a ratio of (Cr/Ni) within a range of 2.0–3.0, or
a ratio of (C/Mo) within a range of 0.015–0.1, or
a quantity of Mo within a range between two values obtained by the following equations (1)a and (2)a, or a value obtained by equation (3)a which is at most 1.1, preferably at most 0.70, or a value obtained by equation (4)a which is within a range of 28–104, preferably 30–60.

$0.54-(4\times\text{carbon content \% by weight})$ (1)a $0.32-(4\times\text{carbon content \% by weight})$ (2)a $(20\times\text{carbon content \% by weight})+(\text{Si content \% by weight})$ (3)a $(1000\times\text{carbon content \% by weight})+(\text{Cr content \% by weight})+(30\times\text{Mo content \% by weight})$. (4)a Further, the present invention provides stainless cast steel having full tempered martensitic structure with the following strength:

toughness at room temperature: at least 500 N/mm², or tensile strength: at least 650 N/mm², preferably at least 750 N/mm², elongation: at least 16%, preferably 25%, reduction of area: at least 45%, preferably at least 60%, 2 mm notch impact value at 0° C.: at least 100 J, preferably at least 140 J, and fracture toughness: at least 6000 [N/mm³/²] N/mm³/².

Stainless steel relating to the present invention can be either cast steel, forged steel, or rolled steel, but, cast steel is preferable. The cast steel relating to the present invention is effective in runners and guide vanes for hydraulic turbines, and is especially effective in pumped-storage hydraulic power plants having ultra high head of at least 500 m, preferably at least 600 m.

A feature of the present invention is in a method for manufacturing stainless steel type 13Cr5Ni wherein stainless steel comprising carbon: 0.008–0.03%, Si: 0.05–0.6%, Mn: 0.1–2.0%, Cr: 11.0–14.0%, Ni: 4.0–7.0%, and Mo: 0.2–2.0%, all by weight, is melted in open air, then poured into a vacuum ladle refining furnace, maintaining the molten metal in the refining furnace for a designated time, and then poured into a preset casting die from the bottom of the refining furnace after boiling of the molten metal has ceased. In cases when an ultra large cast steel part such as a runner for hydraulic turbines is manufactured, it is preferable to pour the molten metal from at least four casting inlets so as to supply the molten metal from lower portions of the casting die and gradually to higher portions of the casting die. The casting inlet is located at an intermediate position between the bottom and the middle of the casting die.

Further, a feature of the present invention is in a pumped-storage hydraulic power plant comprising a hydraulic turbine having a runner which rotates by water flow provided through high hydraulic head water conducting tubes and a generator rotated by the rotation of the runner wherein the hydraulic head is at least 400 m, preferably at least 500 m, and the diameter of the runner is at least 5 m.

Further, a feature of the present invention is in stainless steel having a full tempered martensitic structure having a toughness of at least 600 N/mm², or tensile strength of at least 650 N/mm², elongation of at least 20%, reduction of area of at least 50%, 2 mm notch impact value at 0° C. of at least 100 J, and fracture toughness of at least 6000 [N/mm³/²] N/mm³/². Especially, tensile strength of at least 750 N/mm², and a 2 mm notch impact value of at least 150 J are preferable.

When the hydraulic head is in a range of 400–600 m, the runner is preferably made of stainless steel type 13Cr5Ni having a toughness at room temperature of at least 500 N/mm², or a tensile strength of at least 650 N/mm², an elongation of at least 16%, preferably at least 20%, a reduction of area of at least 45%, a 2 mm notch impact value at 0° C. of at least 100 J, and a fracture toughness of at least 5800 [N/mm³/²] N/mm³/².

Further, when the hydraulic head is larger than 600 m to 800 m, the runner is preferably made of stainless steel type 13Cr5Ni having a toughness of at least 530 N/mm², tensile strength of at least 700 N/mm², an elongation of at least 20%, a reduction of area of at least 50%, a 2 mm notch impact value at 0° C. of at least 100 J, and a fracture toughness of at least 6600 [N/mm³/²] N/mm³/².

Further, when the hydraulic head is larger than 800 m, the runner is preferably made of stainless steel type 13Cr5Ni having a toughness at room temperature of at least 560 N/mm², or a tensile strength of at least 750 N/mm², an elongation of at least 20%, a reduction of area of at least 50%, a 2 mm notch impact value at 0° C. of at least 100 J, and a fracture toughness of at least 6000 [N/mm³/²] N/mm³/2, preferably at least 7400 [N/mm³/²] N/mm³/².

The power plant relating to the present invention can be applied to a pumped-storage power plant using the runner as the pump.

Further, the present invention relates to fluid machines which erode by cavitation in rapid fluid flow or high speed rotation in fluids such as fresh water and sea water, wherein the fluid machines are manufactured of martensitic stainless steel type 13Cr comprising carbon: 10 0.01–0.06%, Ni: at most 6.0%, and Cr: 10–14%, all by weight, and weld cladding layers formed at the surface of parts of the fluid machines with austenitic stainless steel comprising carbon: 0.10–0.30%, Si: at most 1%, Mn: at most 2%, Cr: 16.0–23.0%, Ni: 1.008.00%, and Co: 2.00–9.00%, Ni+Co: 6.00–12.00%, all by weight, wherein the Ni content is at a minimum value obtained by the equation, 10–(40×carbon content % by weight).

When corrosion resistance is further required, at least one of Mo: 0.50–5.00%, and N: 0.05–0.20%, especially Mo, must further be contained in the above weld cladding layer.

Furthermore, in order to improve ductility of the weld metal and to make the structure of the metal fine, one of: V: at most 0.50%, Ti: at most 0.50%, Nb: at most 0.50%, and W: at most 0.50%, must further be contained in the above weld cladding layer so that a sum of the above additives is in a range of 0.10–0.50%.

The weld cladding layer relating to the present invention can be formed either from rods or powder.

One of the features of the present invention is in fluid machines which erode by cavitation in rapid liquid flow or high speed rotation in fluids, wherein the fluid machines are manufactured of stainless steel type 13Cr5Ni having high toughness comprising carbon: 0.008–0.03%, Si: at most 1.0%, Mn: at most 2.0%, Cr: 11.0–14.0%, Ni: 4.0–7.0%, and Mo: 0.2–2.0%, all by weight, and weld cladding layers formed at the surface of parts of the fluid machines with austenitic stainless steel comprising carbon: 0.10–0.30%, Si: at most 1%, Mn: at most 2%, Cr: 16.0–23.0%, Ni: 1.00–8.00%, and Co: 2.00–9.00%, and Ni+Co: 6.00–12.00%, all by weight.

Further, one of the features of the present invention is in an ultra high head pumped-storage hydraulic power plant comprising a hydraulic turbine having a runner which rotates by water flow provided through high hydraulic head water conducting tubes and a generator rotated by the rotation of the runner wherein the hydraulic head is at least 400 m and the diameter of the runner is at least 5 m, wherein the runner is manufactured of cast stainless steel comprising carbon: 0.008–0.03%, Si: at most 1.0%, Mn: at most 2.0%, Cr: 11.0–14.0%, Ni: 4.0–7.0%, and Mo: 0.2–2.0%, all by weight, and weld cladding layers formed at the surface of the runner parts which have the possibility of eroding with austenitic stainless steel comprising carbon: 0.10–0.30%, Si: at most 1%, Mn: at most 2%, Cr: 16.0–23.0%, Ni: 1.00–8.00%, and Co: 2.00–9.00%, and Ni+Co: 6.00–12.00%, all by weight.

In the present invention, composition of the base metal is described below;

Carbon content is restricted to at most 0.03% in order to suppress the consumption of Cr and to prohibit the reduction of corrosion resistance. Further, as grain boundaries become clean, ductility, anti-shock properties, fracture toughness, and fatigue strength are improved. In order to decrease carbon content in a high alloy steel, vacuum ladle refining is necessary. By vacuum ladle refining, carbon content can easily be decreased to at most 0.03% by weight. It is necessary to use low carbon material for the lining of the ladle which is in contact with the molten metal until the molten metal is cast into a casting die or ingot. The low carbon material is also used for adding alloy after oxidizing refining. In order to avoid exposing the molten metal to the atmosphere, the molten metal is not transferred to the ladle for casting from the ladle refining furnace, but is cast directly to the casting die from the ladle refining furnace. Therefore, it is necessary to divide the molten metal into the number of ladles necessary for casting before refining, and then refining the ladles individually in order to cast the molten metal without transferring it.

Carbon is a necessary element for improving the hardenability of the metal on heat treatment and for increasing the toughness by making the structure martensitic, and comprises 0.008–0.03% of the alloy by weight. If the carbon content is less than 0.008%, the above described effect of carbon addition is not realized, and if more than 0.03%, the toughness of the alloy decreases and weldability such as for repairs can not be improved. Especially, a content in the range of 0.010–0.020% is preferable.

Si is added in order to decrease the generation of blow hole defects in welding. If the Si content exceeds 1.0%, it generates δ ferrite and decreases toughness. However, if less than 0.05%, blow hole defects can not be decreased because welding de-oxidation is insufficient. Especially, a content in the range of 0.25–0.60% is preferable.

Mn is an especially important element in the present invention. Mn acts not only as a de-oxidation agent with Si, but also as an agent for preventing segregation of S by stabilizing S in the molten metal by combining with it to form MnS. Further, Mn increases the strength and toughness of martensite after heat treatment as does Ni, as will be explained later. If the Mn content is less than 0.1%, the above effects are hardly realized, and if it exceeds 2%, it increases the amount of austenite remaining and decreases the strength. Especially, a content of at least 0.25% is preferable, and more preferably in the range of 0.5–0.8%.

Ni is a necessary element to stabilize austenite in a martensitic matrix. Further, Ni improves hardenability and weldability, and is necessary for improving the strength and toughness after heat treatment. If the Ni content is less than 4.0%, the above described effects are hardly realized, and if it exceeds 7%, it facilitates the generation of high temperature cracks and decreases the strength by increasing the austenite remaining. Especially, a content in the range of 4.8–5.8% is preferable.

Cr is a necessary element for improving corrosion resistance and for obtaining the martensitic base, and is added in a range of 10–14%. If the Cr content is less than 10%, the corrosion resistance is not sufficient, and if it exceeds 14%, a large amount of δ ferrite is generated in the base and toughness is decreased. Especially, a content of at least 11% is preferable, and more preferably in the range of 12–14%.

Mo is an effective component for improving the corrosion resistance and strength of martensite, and for preventing embrittlement caused by heat treatment. The Mo content is at most 2% in a corrosive environment such as sea water. In order to prevent embrittlement of the thick wall cast steel product, the Mo content is at most 2.0%. If the amount of Mo added is less than 0.2%, the above described effects decrease somewhat, and accordingly, the addition must be at least 0.2%, and if the additive amount exceeds 2.0%, toughness is decreased, and accordingly, the addition must be at most 2.0%. Especially, a content in the range of 0.35–0.6% is preferable, and more preferably in the range of 0.4–0.5%.

Addition of a strong de-oxidation agents such as Mg, Ca, and Ce is preferable. The above elements have similar properties such as being strong de-oxidation agents. Therefore, any of the above components can be used alone or integrally with at least two components. The sum of amounts of the components added integrally is preferably in a range of 0.005–0.03%.

The content of P is preferably at most 0.025%, and the content of S is preferably at most 0.015%.

Further, material relating to the present invention can contain one or at least two kinds of strong carbide forming elements such as Nb, V, W, Ti, Hf, and Zr up to a total of at most 0.2%. Preferably a lower limit of 0.02% is desirable for the above elements.

The stainless steel type 13Cr5Ni of the present invention can be used in any form of forged steel, cast steel, or rolled steel. However, an advantage of the present invention in cast steel can be seen.

As for a specific composition of alloys relating to the present invention, an enhancing index obtained by the following equation (4)a is selected in a range of 28–104, preferably in a range of 30–60, especially in a range of 28–60, more especially in a range of 35–50, more preferably in a range of 40–45;

$$(1000 \times \text{carbon content \% by weight}) + (\text{Cr \% by weight}) + (30 \times \text{Mo \% by weight}) \qquad (4)a$$

By selecting a value of the enhancing index within the above ranges, stainless steel having both high strength and high toughness with a low carbon content can be obtained.

Further, in the present invention, the ratio of contents (% by weight) of (Cr/Ni) is preferably selected within a range of 2.0–3.0 or (C/Mo) is preferably selected within a range of 0.015–0.1. By selecting the content ratio within the above ranges, stainless steel having high strength and high toughness can be obtained. Especially, a range of 0.025–0.045 is preferable.

Further, in the present invention, stainless steel having high strength and high toughness can be obtained by selecting the Mo content (% by weight) within a range between the two values obtained by the following equations (1)a and (2)a;

$$0.54 - (4 \times \text{carbon content \% by weight}) \qquad (1)a$$

$$0.32 - (4 \times \text{carbon content \% by weight}) \qquad (2)a$$

Further, in the present invention, stainless steel type 13Cr5Ni having high strength and high toughness can be obtained by selecting a value obtained by equation (3)a to at most 1.1, preferably at most 0.70, more preferably in a range of 0.25–1.1, especially 0.45–1.0, more especially in a range of 0.3–0.6.

$$(20 \times \text{carbon content \% by weight}) + (\text{Si \% by weight}) \qquad (3)a$$

The present invention is most effective in applying to runners for pumped-storage hydraulic power plants having an ultra high hydraulic head of more than 400 m. However, the present invention is applicable to other hydraulic turbines such as Pelton turbines, vertical and horizontal shaft Fransis turbines, diagonal flow pump water turbines, and Kaplan turbines. The present invention is effective in runners, guide vanes, and other parts of the above turbines. Especially, the present invention is effective in runners having a diameter of at least 5 m.

In accordance with the present invention, weld cladding layers can be formed with material having higher erosion resistance than the base metals at the surface of parts of fluid machines made of stainless steel where cavitation erosion is expected, and accordingly, life of the fluid machines can be improved. As for the material for the weld cladding layers, the materials described above can preferably be used.

Next, composition of material used for forming weld cladding layers in the present invention is defined below.

Carbon is a necessary element for forming an austenitic structure, and concurrently, carbon is an effective element for increasing the strength and hardness of the material and improving erosion resistance. However, if the content is less than 0.10%, the above effects can not be sufficiently realized because, although weldability is improved, the martensitic phase is yielded in the austenitic matrix by the composition range of the present invention, and regions hardened by the local generation of induced martensitic phase are effective for improving erosion resistance. On the other hand, if the content exceeds 0.30%, although it may change somewhat depending on balance with Ni, Co, and Cr contents, erosion resistance increases, but ductility remarkably decreases, and the generation of weld crack at high temperature increases significantly. Therefore, in consideration of both erosion resistance and weldability, carbon content is preferably in a range of 0.10–0.30%, more preferably in a range of 0.15–0.26%.

Si is a necessary element for forming ferrite, and normally, is added to at most 1% on account of de-oxidation upon melting of the alloy and welding. As an excess addition of Si decreases toughness of the material, the Si component in the present invention is restricted to at most 1%, the same as for Si content in normal austenitic alloys. Especially, a range of 0.2–0.6% is preferable.

Mn is generally added by at most 2% for de-oxidation and desulfuration of austenitic steel. An excess addition of Mn decreases flowing characteristics of molten metals and weldability. Accordingly, Mn content in the present invention is restricted to at most 2%. Especially, a range of 0.3–1.5% is preferable.

Ni and Co are important elements for providing welding materials having preferable erosion resistance in the present invention. Ni is a necessary element for forming austenite, and it improves strength, ductility, and toughness of the material by forming an austenitic phase matrix with co-existence of Cr. A feature of the present invention is in altering the excessively unstable austenitic structure to work induced martensite by impact pressure at cavitation breaking, and especially in improving erosion resistance. Accordingly, the additive amount of Ni has a close relationship to the additive amount of carbon and Co, and is important to the erosion resistance. Therefore, although it is preferable to restrict Ni content to as low as possible, Co content must be increased to retaining austenitic structure, and a sum of the Ni content and Co content, (NI+Co), is preferably in a range of 6–12% by weight. A range of 8–11% is more preferable.

That means, the additive amount of Ni is preferably in a range of 1–8%, and the remainder can be replaced with Co to improve erosion resistance. However, in the complex ratio of Ni and Co, when the Ni content is large, preferable characteristics can not be obtained with a carbon content of less than 0.15% because of the erosion resistance. Co is a relatively weak austenite forming element, and its forming power is ⅓ of that of Ni. Therefore, in the complex ratio of Ni and Co, when the Ni content is small, the amount of Co and carbon must necessarily be increased. The increased amount of Co and carbon operates effectively to improve the erosion resistance. However, carbon content must be at most 0.30% to prevent weld cracking. Accordingly, an amount of Co of at least 2% is necessary. However, an amount of Co exceeding 9% does not improve erosion resistance. Especially, Ni of 2.0–6.0%, and Co of 5–8.0% are preferable.

Cr is a ferrite forming element, effective for improving corrosion resistance in fresh water and sea water, coexisting with Ni, and forms an austenitic structure including a small amount of ferrite. If Cr is less than 16%, a martensitic structure is formed in an austenitic phase, and if more than 23%, the amount of ferrite increases, and accordingly, ductility, erosion resistance, and weldability deteriorate. A preferable range is between 17% and 21%, but, when the contacting liquid is strongly corrosive such as sea water, a range of 19–22% is desirable in consideration of the corrosion resistance.

Mo improves corrosion resistance, and is further effective in improving erosion resistance by strengthening the base metal of the padding layer. A reason for adding Mo in the present invention is to include it in the material for repairing apparatus and its parts used in highly corrosive liquid such as sea water and adding erosion resistance to the apparatus and parts. However, Mo is hardly effective if the added amount is less than 0.5%, and deteriorates weldability by forming a large amount of δ ferrite if the added amount is more than 5%. Accordingly, in the present invention, the Mo content was restricted in to a range of 0.50–5.00%. The range is preferably from 2.0% to 3.0%.

N is an effective element for stabilizing the austenitic phase in addition to improving the strength and erosion resistance. However, the addition of N in the present invention in a range of at least 21–25% as a sum with Cr and Mo, is mainly aimed at suppressing formation of ferrite which effects weldability. Nitrogen added excessively forms nitride, and effects the toughness and corrosion resistance. Therefore, N content was restricted to a range of 0.05–0.20%.

V, Ti, Nb, and W are carbide forming elements, but an addition less than 0.8% of the above elements improves ductility. Therefore, in the present invention, a small amount of the above elements such as not to effect erosion resistance and weldability of the padding material was added in order to improve ductility of the padding material. However, V, Ti, Nb, and W are significantly effective if added in a range of 0.2%–0.5%, and influences ductility and weldability if added by more than 10%. Therefore, in the present invention, an amount of each of the above elements was restricted to less than 0.50%.

The residual is consisted with Fe and accompanying impurities including P, S, As, Sb, and the like. However, the impurities are desirably as little as possible because the above elements deteriorate ductility, and toughness, in addition to lowering the weldability.

In the present invention, oxidants such as Ca, Mg, rare earth elements, and Y can be added in order to increase ductility of the padding material. The content of one or two kinds of the above elements is preferably less than 0.5%.

In the present invention, the contents of C and Ni have a close relationship, and adding an amount of Ni must be determined in consideration of the content of C so as to be at least the value obtained by the following equation;

$$Ni=10-(40\times C) \text{ (\% by weight)} \quad (1)b$$

Especially, the amount of Ni added is preferably determined so as to make a value, hereinafter called NC-value, calculated by the following equation to be in a range of 15–25%;

$$NC\text{-value}=70\times C \text{ (\% by weight)}+Ni \text{ (\% by weight)} \quad (2)b$$

When the content of Co is in a range of 2–4%, the NC-value is preferably in a range of 20–25%. Further, an upper limit of Ni content is desirably determined as a value which is obtained by adding 4 to the value obtained by the above equation (1)b.

Further, contents of Ni and Cr have a close relationship, and the amount of Cr added must be determined in consideration of the content of Ni so as to be at least a value obtained by the following equation;

$$Cr=20.5-0.55Ni \text{ (\% by weight)} \quad (3)b$$

Further, an upper limit of Cr content is desirably determined as a value which is obtained by adding 3.5 to the value obtained by the above equation (3)b.

Furthermore, contents of C and Cr have a close relationship, and the amount of C added must be determined in consideration of the content of Cr so as to be at least a value obtained by the following equation;

$$C=0.0282Cr \text{ (\% by weight)} \quad (4)b$$

Further, an upper limit of C content is desirably determined as a value which is obtained by adding 0.11 to the value obtained by the above equation (4)b.

Thickness of the padding layer is preferably in a range of 3–20 mm.

The dilution ratio of the base material is about 30–35% using a coated arc welding method using welding rods or a TIG welding method using rods, and about 5–7% using a plasma arc welding method using powder. Accordingly, in the case of the plasma arc welding method using powder, the padding material can be obtained even by mono-layer padding of 3 mm thick. However, in the case of the coated arc and TIG welding method, the padding can not be obtained sufficiently by mono-layer padding alone because of the high dilution ratio of the base material, and padding thicker than mono-layer is necessary.

However, if a padding layer thicker than 20 mm is required, a multi-layer padding operation of more than six layers becomes necessary, and consequently a heat history of repeated heating and cooling of the base material and the padding causes undesirable effects to the padding material such as mechanical strength, and the like. In consideration of the above effects, the padding layer thickness was restricted to a range of 3–20 mm, which can be obtained by 1–6 layers of padding operation, although the padding thickness depends on the depth of damaged portions. Preferably, padding thickness by powder plasma arc welding method is in a range of 3–8 mm (1–3 layers of padding) including cutting thickness for surface finish, and padding thickness by coating arc and TIG welding is in a range of 6–15 mm (2–5 layers of padding).

As for parts of fluid machinery, 13Cr5Ni cast steel or forged steel comprising C 0.01–0.06%, Si at most 1%, Mn at most 2%, Ni at most 6%, Cr 10–14%, and Mo 0.05–0.5% is preferable. The amount of Ni is preferably in a range of 4–6%. As for heat treatment, a martensitic structure including at most 10% ferrite of normalized tempered steel is preferable.

DETAILED DESCRIPTION OF THE DRAWINGS

DETAILED DESCRIPTION OF THE EMBODIMENTS

Embodiment 1

Table 1 indicates the chemical composition % by weight) of conventional 13Cr5Ni steel and test pieces of ow carbon steel relating to the present invention. Both the conventional 13Cr5Ni steel and the test pieces of low carbon steel relating to the present invention were treated by vacuum ladle refining, and the molten metal was poured directly into casting dies. The cast steel obtained was heat treated for normalizing by heating at 980° C. for 18 hours, and tempering at 600° C. for 18 hours. Fracture toughness was determined on the specimen having an initial crack from load and crack propagation length. Weldability was determined by welding leigh-high shaped test pieces, which were apt to generate constraint cracks, and measuring the crack lengths at the cross section. Fatigue strength in water was obtained by rotatory bending fatigue test in service water from a water line.

TABLE 1

| Component | C | Si | Mn | p | S | Ni |
|---|---|---|---|---|---|---|
| Conventional Steel | 0.047 | 0.40 | 0.60 | 0.024 | 0.012 | 4.94 |

TABLE 1-continued

| | | | | | | |
|---|---|---|---|---|---|---|
| Low carbon steel | 0.013 | 0.25 | 0.68 | 0.024 | 0.006 | 4.97 |

| Component | Cr | Mo | C/Mo | Cr/Ni | Strengthened index |
|---|---|---|---|---|---|
| Conventional steel | 12.73 | 0.30 | 0.157 | 2.58 | 70.2 |
| Low carbon steel | 13.46 | 0.44 | 0.0325 | 2.71 | 41.9 |

As a result of observing the metallic structures of the conventional steel and the low carbon steel, the precipitation of black linear chromium carbide was observed at the grain boundary of the conventional steel, but not observed in the low carbon steel relating to the present invention. The low carbon steel had a tempered martensitic structure.

Figure 1:
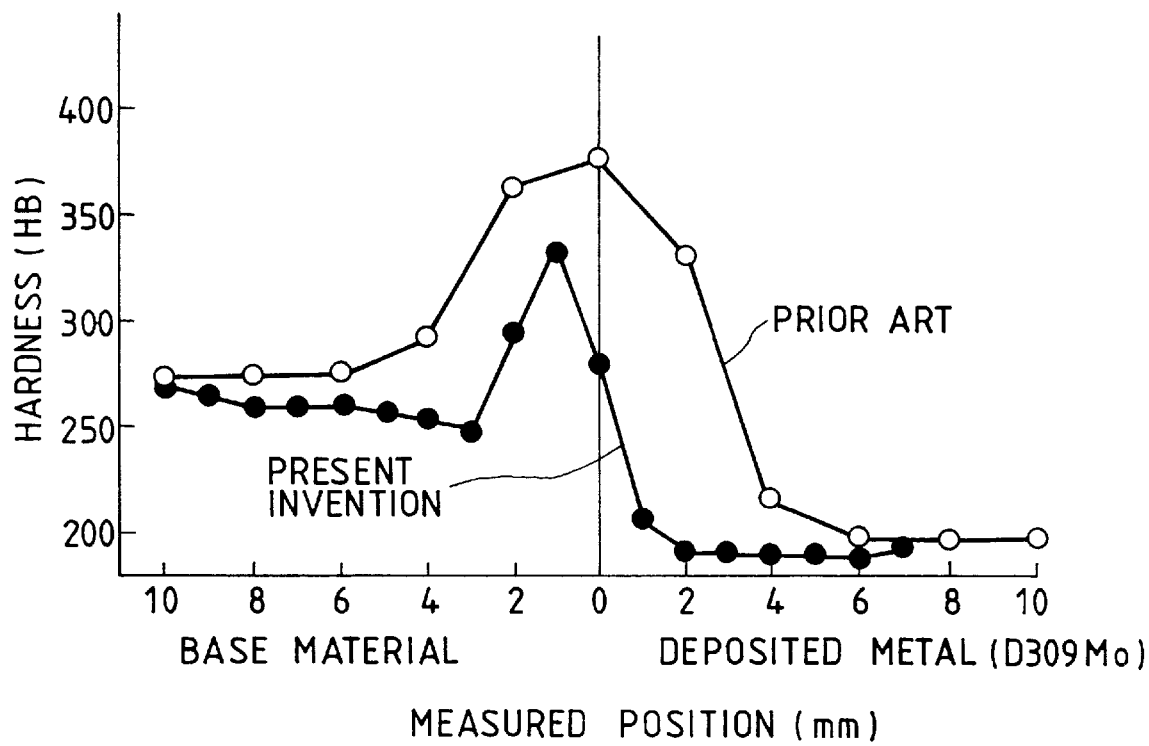
FIG. 1 is a graph indicating the relationship between hardness and welding position.

FIG. 1 is a graph indicating a hardness distribution after welding without any treatment. The conventional steel is hardened to a maximum of 375 by Brinell hardness, and a heat affected zone having a hardness of at least 300 is 6.3 mm wide. Further, deposited metal near the boundary with the base metal is also hardened by dilution of carbon in the deposited metal and the base metal. On the contrary, the low carbon steel relating to the present invention is hardened to a maximum of 333, the heat affected zone having a hardness of at least 300 is narrower than that of the conventional steel as 2.2 mm wide, and has less influence on welded bonding performance.

Figure 2:
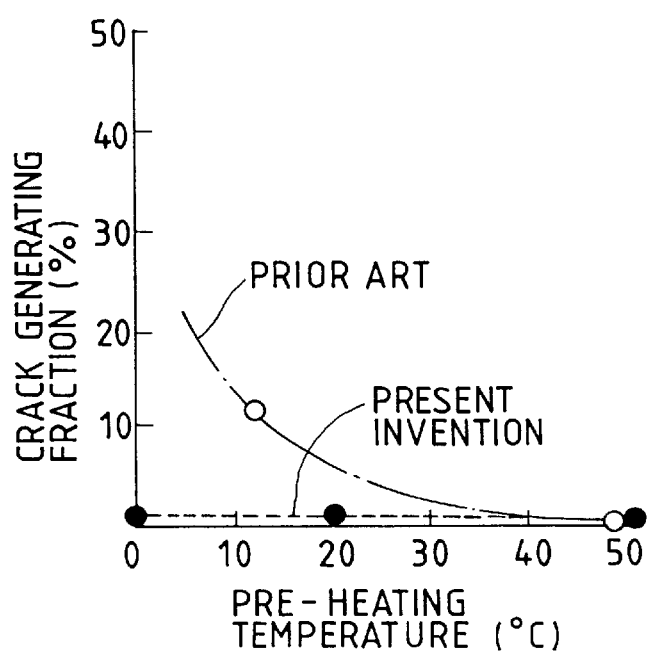
FIG. 2 is a graph indicating the relationship between weld crack generating fraction and pre-heating temperature.

FIG. 2 is a graph indicating the result of a constraint cracking test. The conventional steel generated cracks of 11% of the cross section by welding with a pre-heating temperature of 10° C., but the low carbon steel of the present invention did not generate any crack even by welding with a pre-heating of 0° C.

Figure 3:
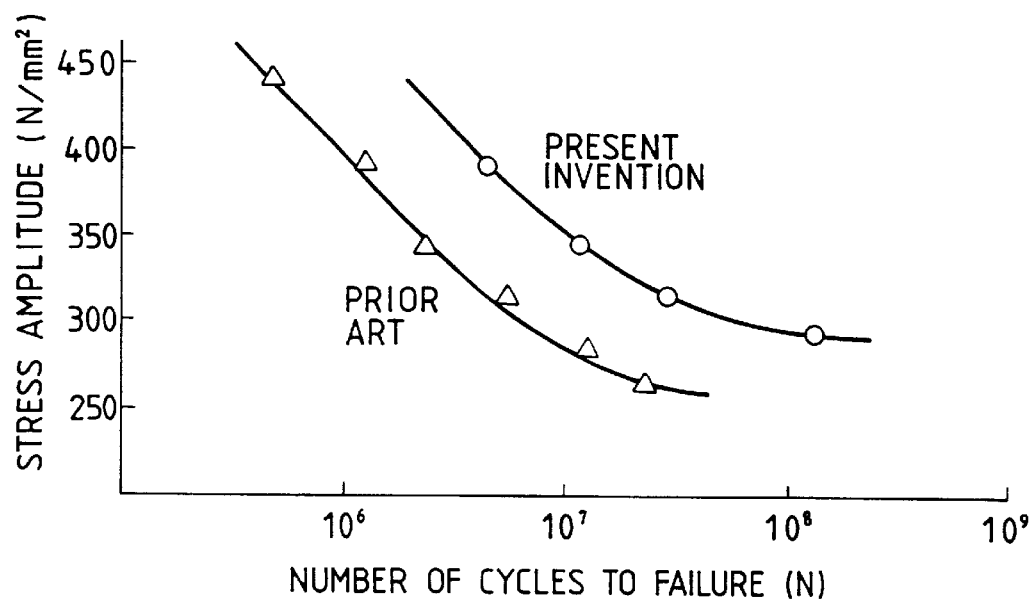
FIG. 3 is a graph indicting the relationship between stress amplitude and cycles of repeating stress before breakage.

FIG. 3 is a graph indicating the result of a fatigue test in water. In comparison with the conventional steel, the low carbon steel of the present invention indicates a higher fatigue limit by about 30 N/mm$^2$. The low carbon steel of the present invention has a high fatigue strength to repeated stress of $10^8$ times at 291 N/mm$^2$.

Figure 4:
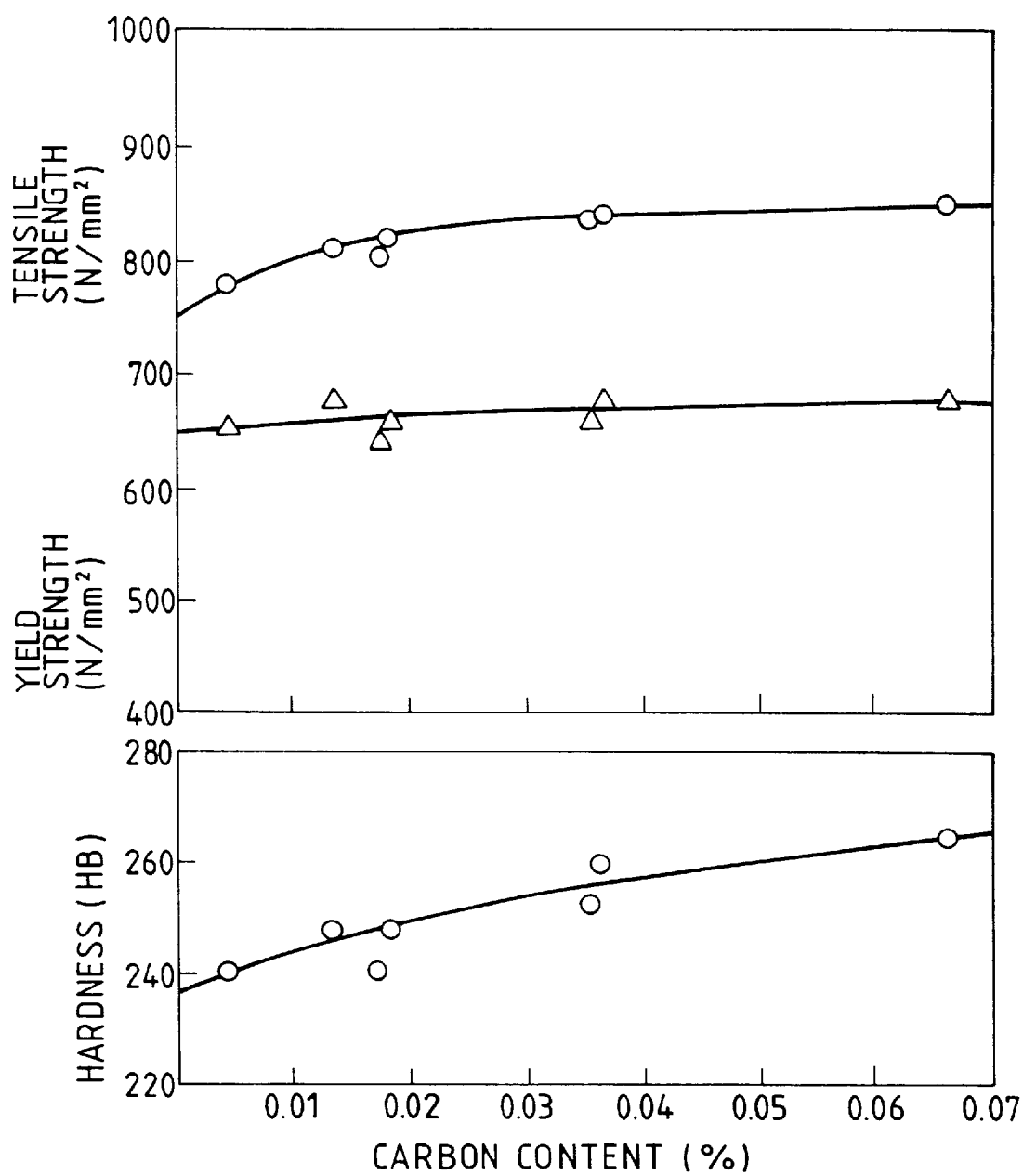
FIG. 4 are graphs indicating the relationships between carbon content and tensile stress, yield strength, and hardness.
Figure 5:
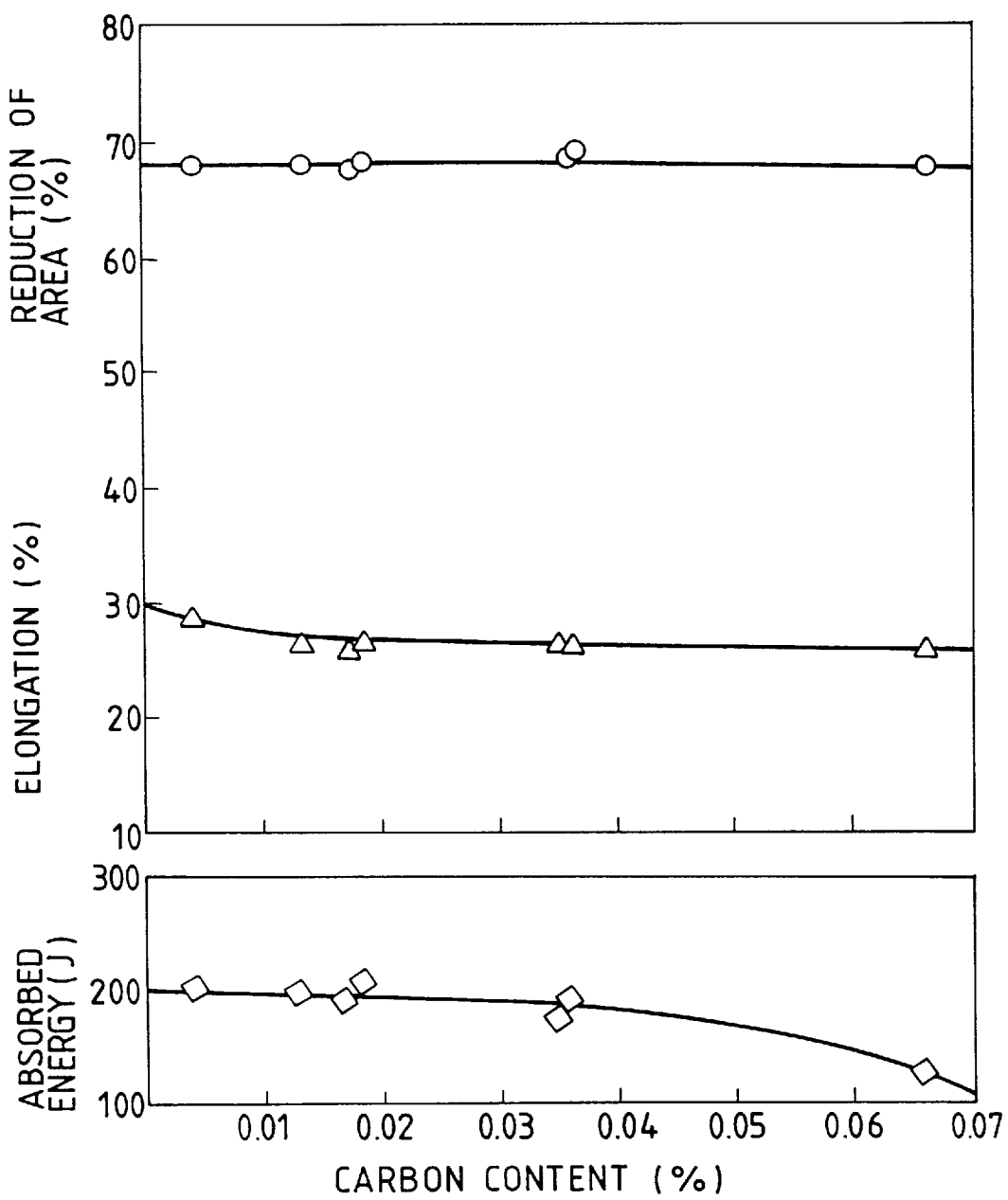
FIG. 5 are graphs indicating the relationships between carbon content and reduction of area, elongation, and absorbed energy.

FIGS. 4 and 5 are drawings indicating a relationship between carbon content and mechanical characteristics. The specimen is obtained by melting it in a laboratory atmosphere, and consequently, the absolute values of auctility and toughness obtained are lower than that of the steel which is obtained by vacuum ladle refining. As shown in FIG. 4, the tensile strength decreases as the carbon content decreases lower than 0.03%, but the yield strength does not indicate significant change. The hardness decreases with a decrease of the carbon content. As shown in FIG. 5, the elongation and the absorbed energy increase when the carbon content is lowered to less than 0.03%. The reduction of area does not show significant change. Therefore, by decreasing the carbon content to less than 0.03%, the toughness can be improved without influencing the yield strength. When toughness and a certain amount of tensile strength are required, a lower limit of the carbon content must be selected to be 0.01%.

Table 2 indicates various characteristics of conventional steel and the low carbon steel of the present invention obtained by the vacuum ladle refining. In accordance with the present embodiment, the following characteristics can be obtained;

(1) Impact characteristics increases 40%, and fracture toughness increases 60%. Accordingly, apparatus using the low carbon steel of the present invention can use thinner walls without losing reliability, and improved efficiency can be realized. Even if a crack is generated at a stress concentrated portion, the low carbon steel has a preferable fracture toughness, and accordingly, propagation of the crack can be prevented and a brittle fracture, which is not repairable, can be avoided.

(2) Fluid machinery used for a long period necessitates weld repairing because of generated cavitation. For the repair, the low carbon steel of the present invention has preferable weldability, and accordingly, extends life of the machinery.

(3) The corrosion resistance of stainless steel is generally lowered by deposition of chromium carbide. However, the low carbon steel of the present invention has a low carbon content less than 0.03%, and accordingly, generating carbides and deposition of the carbides at the grain boundary can be prevented.

The low carbon steel of the present invention has a Cr/Ni value of 2.71, C/Mo value of 0.03, and obtained by the equation (20C+Si) of 0.51, obtained by the equation (1000C+Cr+35Mo) of 41.86.

TABLE 2

| | Prior art (1) | Invention (2) | (2)/(1) (%) |
|---|---|---|---|
| Metallic structure | Precipitating carbide | Trace of carbide | — |
| Tensile test | | | |
| Strength (N/mm$^2$) | 839 | 776 | 92 |
| Yield strength (N/mm$^2$) | 640 | 626 | 98 |
| Elongation (%) | 24.3 | 26.5 | 109 |
| Reduction of area (%) | 58.8 | 67.9 | 115 |
| Hardness (HB) | 264 | 248 | 94 |
| Impact test | | | |
| 2U, 0° C. (J) | 132 | 193 | 146 |
| 2V, 0° C. (J) | 110 | 156 | 142 |
| 5U, 20° Cz (J) | 95 | 121 | 127 |
| Fracture toughness test (N/mm$^{3/2}$) | 5198 | 8247 | 159 |
| Weldability Constraint crack test | | | |
| Required preheating (°C.) As weld | 50 | 0 | |
| HAZ max. hardness (HB) | 375 | 333 | 89 |
| Range at least 300 HB (mm) | 6.3 | 2.2 | 35 |
| Fatigue strength in water $10^8$ (N/mm$^2$) | 259 | 291 | 112 |

Figure 6:
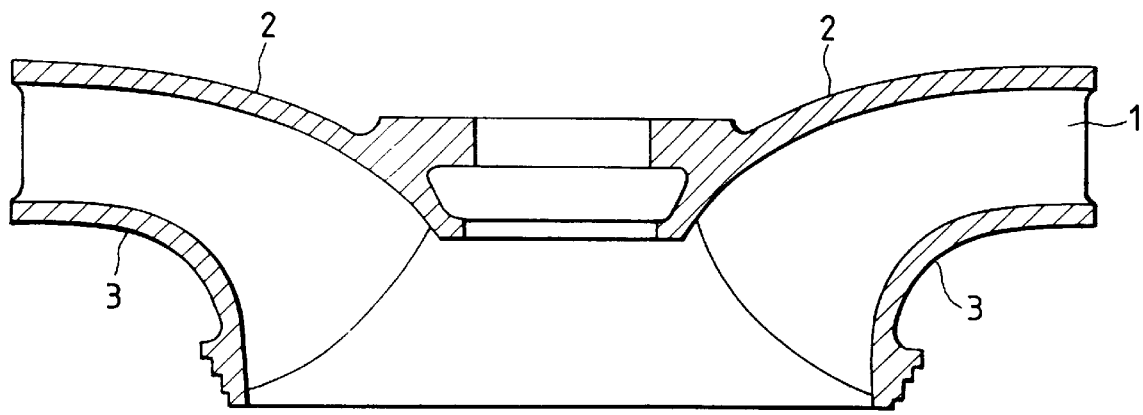
FIG. 6 is a cross section of a runner for a pump turbine.

Remarks:
(1) Prior art; Conventional type 13Cr5Ni steel
(2) Present invention: Low carbon steel FIG. 6 is a partial cross section of a runner for a pump turbine having the above described alloy composition manufactured by a vacuum ladle refining process. The runner comprises vanes 1, crowns 2, and shroud rings 3, and is about 5.5 m in diameter and about 50 tons in gross weight. After casting and foundry sand shake out, the heat treatment described above was performed. After normalizing and air blast cooling, tempering was performed in order to form a tempered martensitic structure. The runner was inspected by magnetic particle penetration, and ultrasonic crack detector. If any crack was observed, the runner was repaired by welding using a coated arc welding rod made of the same material as the base metal. The repair by welding in the present invention could be performed without pre-heating because of using low carbon steel was used. After the weld repairing, annealing was performed in order to form a full tempered martensitic structure. The above normalizing was performed by forced air cooling. The casting was performed with setting weirs and sprue runners at four points in the shroud ring portion.

The entrance width of the vane 1 of the runner in the present embodiment is 0.11 the diameter of the runner, and the width is preferably in a range of 0.095–0.12 the diameter of the runner. Further, the outlet width of the vane 1 is 2.1 times the entrance width, and is preferably in a range of 1.85–2.3 times. The outlet width of the vane 1 is expressed as a linear length.

The length of the vane 1 at the upper portion of the vane is 0.37 times the diameter of the runner, and is preferably in a range of 0.3–0.4 times, and at the lower portion is 0.21 times and preferably in a range of 1.8–2.3 times.

Figure 7:
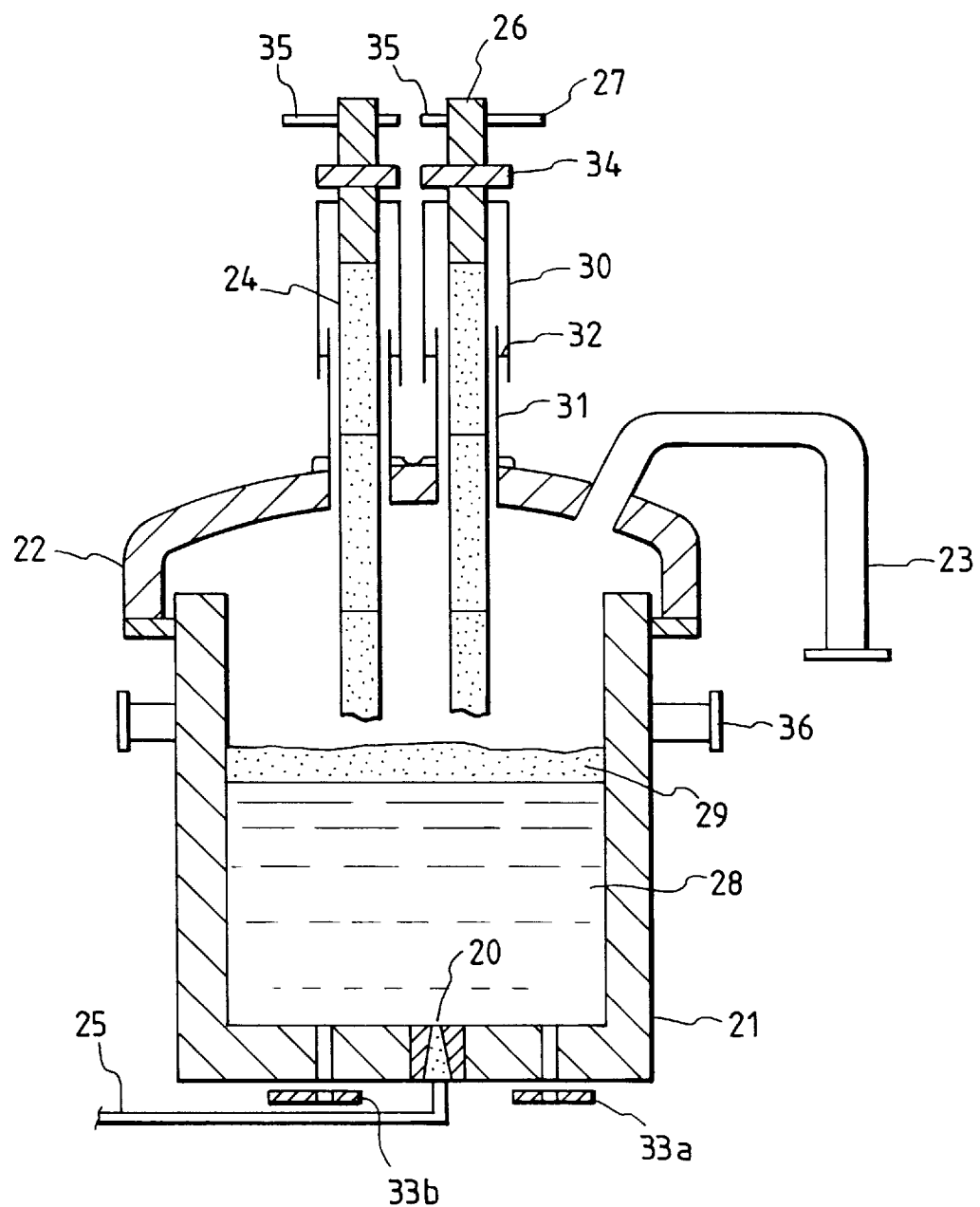
FIG. 7 is a schematic cross section of a vacuum ladle refining apparatus.

The vacuum ladle refining of the present embodiment was performed by the following steps;

FIG. 7 is a schematic cross section of the vacuum ladle refining apparatus used in the present embodiment. A ladle 21 has a blowing nozzle 20 for inert gas and molten metal outlets 33a, 33b, which are sliding nozzles, at the bottom. The blowing nozzle 20 for inert gas can be provided at the side wall of the ladle, but the bottom of the ladle is preferable in order to enhance the mixing effect of the molten metal. The numerical mark 25 indicates piping for supplying the inert gas.

A lid 22 for the ladle is hermetically sealed by a sealing mechanism (not shown in FIG. 7) at the side wall of the ladle 21, and is provided with piping 23 for connection to an evacuating apparatus. Further, holes for penetrating non-consumable electrodes 24 made of graphite are provided.

In order to prevent air leaking into the ladle, an auxiliary electrode 6 made of metal is attached at an upper portion of the electrode made of graphite. Copper is used as the material for the auxiliary electrode. The auxiliary electrode has a watercooling structure because it is heated to hundreds of degrees. The numerical mark 27 indicates piping for supplying water to cool the auxiliary electrode, and 35 is drain piping. The numerical mark 28 indicates molten metal, and 29 is slag.

A sealing mechanism covering the non-consumable electrode made of graphite protruding out from the lid of the ladle is arranged between the auxiliary electrode 26 and the lid 22 of the ladle. The sealing mechanism comprises an upper cylinder 30 fixed to the auxiliary electrode and a lower cylinder 31 fixed to the lid of the ladle. The upper cylinder is composed so as to move in accordance with vertical moving of the non-consumable electrode. The graphite electrode is porous, and is not entirely exposed to the atmosphere by wrapping its whole body with metal, and accordingly, maintaining a hermetical seal of the whole apparatus.

A part of the upper cylinder 30, which slides in contact with the outer surface of the lower cylinder 31, is provided with a packing in order to avoid leaking air into the cylinder.

First, molten metal having an closely objective alloy composition was obtained by melting in air, subsequently the molten metal was transferred to the ladle indicated in the present embodiment, and was refined.

The temperature of the molten metal upon transfer to the ladle for refining was about 1750° C. In order to make the molten metal contain excessive oxygen, oxygen gas of about 2 Nm$^3$/t was blown into the molten metal using a lance pipe.

Subsequently, vacuum pumping was started to maintain boiling of the molten metal for about 15–20 minutes. During the vacuum pumping, the degree of vacuum in the ladle reached 1 mmHg. The vacuum pumping was maintained below 1 mmHg for 10 minutes after boiling of the molten metal was repressed. At this time, the carbon content in the molten metal decreased to 0.005%, oxygen content to 154 ppm, and nitrogen content to 103 ppm. After adding CaO and CaF as flux, and Al and FeSi as reducing agents, the temperature of the molten metal was adjusted by arc heating, and the chemical composition was adjusted by adding alloy composition.

The composition of the molten metal after the above refining was as shown on Table 1.

The molten metal in the ladle obtained by refining as described above was set above a runner casting die by hanging the ladle with a crane, and the molten metal was poured into the casting die through the molten metal outlets 33a, 33b simultaneously. In the present embodiment, two sets of vacuum ladle refining apparatuses were used for pouring the molten metal through two molten metal outlets into the casting die at the upper portion and the lower portion of the outer circumference of the shroud ring 3 at positions on a mutually diametral extension line. The casting die was made of foundry sand.

Figure 8:
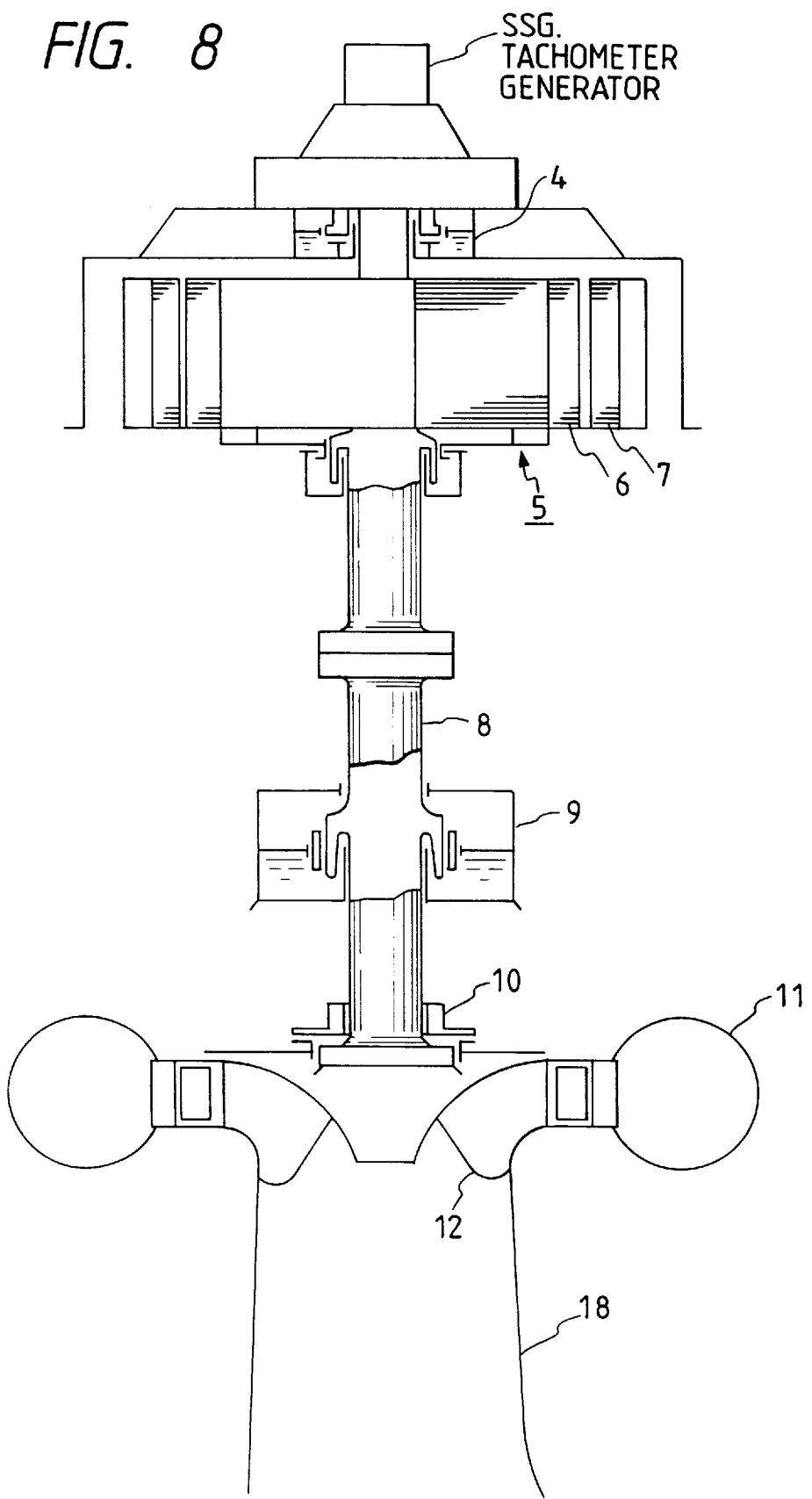
FIG. 8 is an illustration indicating the composition of a pump turbine generating plant.

FIG. 8 is an illustration indicating the total composition of a 400–1000 m grade high head pump turbine generator using the runner 12 manufactured in accordance with the present embodiment. The runner 12 is hung by a main shaft 8, and is supported by an upper bearing 4 and a main bearing 9. A generator 5 is rotated by rotation of the runner 12, and electric power is generated. The generator comprises a rotor 6 and a stator 7. Water to the runner 12 is introduced through a spiral casing, runs fast by the high head, and enters into the runner 12 to rotate. When pumping water using electric power at night, the generator 5 is used as a driving power for the pump. Water outgoing from the runner 12 is sent to a reservoir through an exhaust water pipe 18.

Figure 9:
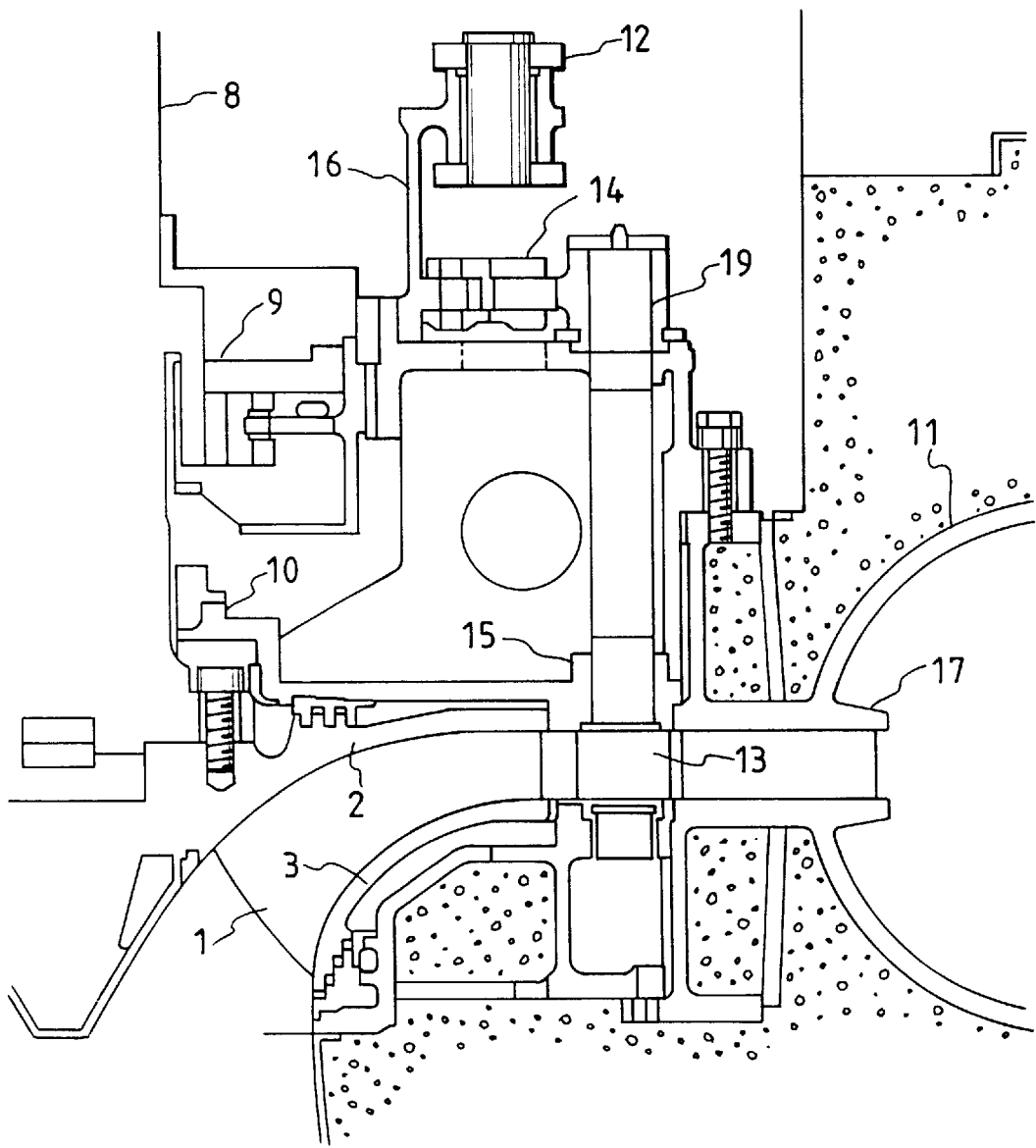
FIG. 9 is a schematic partial detailed cross section of a runner portion in a pump turbine generator.

FIG. 9 is a partial detailed cross section schematic of a runner portion in a pump turbine generator. As shown in FIG. 9, a guide vane 13 is provided in order to send water effectively to the runner 12. The guide vane 13 in the present embodiment is manufactured of the same material as the material of the runner 12 integral with the shaft 19 in the same ladle refining process as the one described above. The same heat treatment as the runner is performed to the guide vane to obtain full tempered martensitic structure. The guide vane 13 is driven through a guide vane lever 14, a guide vane link 18, and a guide ring 16. The casing 11 is assembled with steel plates by welding. An oilless bearing can be used as a bushing 15. The guide vane lever 14 is made of cast steel.

Embodiment 2

Table 3 indicates chemical compositions, amounts of erosion obtained by a magnetostrictive vibrating tester, and Vickers hardness of coated arc deposited metal used in the present invention for weld padding to the 5Ni13Cr cast steel (Sample No. 10) and comparative examples. Samples from No. 1 to No. 7 are padding material used in the present invention. The welding rod is 4 mm in diameter, and the coated agent is lime-titania type. Among the padding metal components, C, Si, Mn, Ni, and a part of Cr were added from the core rod of the welding rod, and the other components were added from the coated agent. The samples from No. 8 to No. 10 are comparative materials, No. 8 and No. 9 are commercially available welding rods, D-308 and D-309, of 4 mm in diameter, and No. 10 is 5Ni13Cr cast steel used as material for conventional runners of hydraulic turbine. The weld padding was performed by pre-heating and inter-layers temperature at 150° C., welding current 140–150 A, voltage 23 V, depositing speed about 1 kg/h, and three layers padding (padding layer thickness: about 10 mm). The erosion test and the hardness test were performed on a surface obtained by cutting off the padding surface layer by 2 mm.

TABLE 3-1

| Sample | Components (% by weight) | | | | | |
|---|---|---|---|---|---|---|
| No. | C | Si | Mn | Ni | Cr | Co |
| 1 | 0.19 | 0.54 | 0.59 | 2.57 | 18.89 | 7.02 |
| 2 | 0.21 | 0.44 | 0.65 | 5.08 | 19.63 | 5.92 |
| 3 | 0.29 | 0.31 | 1.25 | 2.25 | 22.44 | 6.12 |
| 4 | 0.28 | 0.75 | 0.55 | 1.12 | 19.86 | 8.96 |
| 5 | 0.11 | 0.54 | 0.65 | 7.88 | 16.25 | 2.12 |
| 6 | 0.29 | 0.45 | 1.84 | 1.11 | 21.68 | 7.54 |
| 7 | 0.21 | 0.55 | 0.75 | 3.38 | 20.01 | 2.16 |
| 8 | 0.06 | 0.36 | 1.85 | 10.30 | 20.03 | — |
| 9 | 0.05 | 0.46 | 1.52 | 12.79 | 21.45 | — |
| 10 | 0.06 | 0.35 | 0.60 | 4.94 | 12.94 | — |

TABLE 3-2

| Sample | Components (% by weight) | | | | | |
|---|---|---|---|---|---|---|
| No. | Mo | N | V | Nb | Ti | W |
| 1 | — | — | — | — | — | — |
| 2 | — | — | — | — | — | — |
| 3 | 0.51 | — | — | — | — | — |
| 4 | 4.68 | 0.13 | — | — | — | — |
| 5 | 1.50 | 0.12 | 0.11 | — | — | — |
| 6 | — | — | 0.45 | — | — | — |
| 7 | — | — | 0.11 | 0.21 | 0.09 | 0.07 |
| 8 | — | — | — | — | — | — |
| 9 | 2.10 | — | — | — | — | — |
| 10 | 0.26 | — | — | — | — | — |

TABLE 3-3

| Sample No. | Amount of erosion (mg/2 h) | Hardness (Hv) | Remarks | | | Ni equivalent |
|---|---|---|---|---|---|---|
| | | | Co/Ni | Co + Ni | 70C + Ni | |
| 1 | 5.3 | 260 | 2.73 | 9.59 | 15.87 | 8.34 |
| 2 | 6.1 | 269 | 1.17 | 11.0 | 19.78 | 8.60 |
| 3 | 5.8 | 280 | 2.72 | 8.37 | 22.55 | 11.37 |
| 4 | 6.5 | 275 | 8 | 10.08 | 20.72 | 11.58 |
| 5 | 8.9 | 257 | — | 10.0 | 15.58 | 4.34 |
| 6 | 6.7 | 278 | — | 8.65 | 21.41 | 12.12 |
| 7 | 7.9 | 269 | — | 6.04 | 18.58 | 7.40 |
| 8 | 65.0 | 201 | D308 | | | — | — |
| 9 | 56.5 | 230 | D309Mo | | | — | — |
| 10 | 53.0 | 272 | 5Ni13Cr cast steel | | | — | — |

Remarks: Ni equivalent = (30 × C + Ni + ½Mn + ⅓Co)
Sample No. 1–7 (Present invention)
Sample No. 8–10 (Comparative examples)

FIG. 3 reveals that the padding materials used in the present invention have higher hardness and less amount of erosion than comparative examples (Sample No. 8 and 9) which are conventionally used for weld repairing. That is, erosion resistance of the padding materials improves by about 7–10 times compared to the examples (Sample No. 8 and 9). Further, in comparison with a representative steel 5Ni13Cr cast steel; comparative example No. 10) for improving erosion resistance in the present invention, the padding materials have erosion resistance of about 6–10 times.

FIG. 4 indicates values obtained by various equations from the composition of the materials relating to the present invention.

Any of the padding materials used in the present invention and the comparative examples did not show defects such as welding crack and others in padding surface layer before and after the testing. The padding layer by TIG welding rod and powder showed the same trend as the above materials.

FIG. 5 indicates work hardening coefficients (hardness after the testing/hardness before the testing) obtained from surface hardness before and after the erosion test. The padding materials relating to the present invention have larger work hardening coefficients than that of the comparative examples.

TABLE 4

| Example No. | 10-40C | 20-0.55 Ni | 0.028Cr-0.364 |
|---|---|---|---|
| 1 | 3.4 | 18.59 | 0.169 |
| 2 | 1.6 | 17.21 | 0.190 |
| 3 | — | 18.76 | 0.269 |
| 4 | — | 19.38 | 0.196 |
| 5 | 5.6 | 15.67 | 0.094 |
| 6 | — | 19.39 | 0.247 |
| 7 | 1.6 | 17.87 | 0.200 |

TABLE 5

| | Hardness (Hv) | | Work hardening coefficient (A)/(B) |
|---|---|---|---|
| Sample No. | Before testing (B) | After testing (A) | |
| 1 | 260 | 659 | 2.54 |
| 2 | 269 | 660 | 2.45 |
| 3 | 280 | 645 | 2.30 |
| 4 | 275 | 650 | 2.36 |
| 5 | 257 | 632 | 2.46 |
| 6 | 278 | 648 | 2.33 |
| 7 | 269 | 659 | 2.45 |
| 8 (308) | 201 | 314 | 1.56 |
| 9 (D309Mo) | 230 | 352 | 1.53 |
| 10 (5Ni13Cr cast steel) | 272 | 275 | 1.01 |

Remarks:
Sample No. 1–7 (present invention)
Sample No. 8–10 (Comparative examples)

Figure 10:
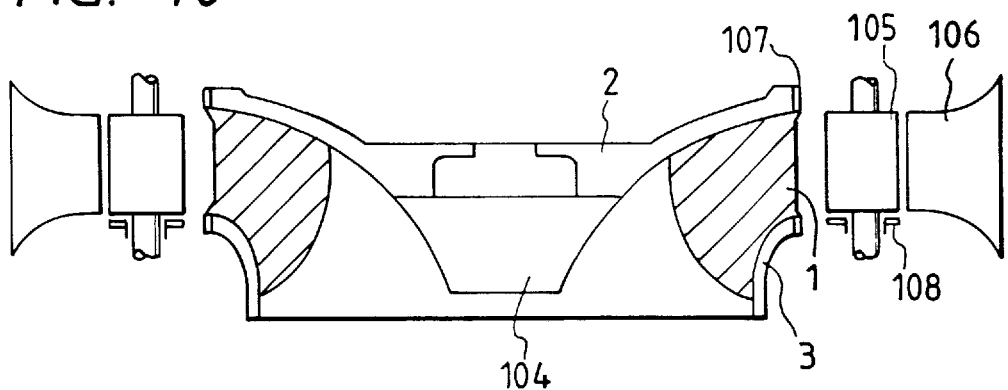
FIG. 10 is a cross section of a francis turbine whereon the weld padding layer of the present invention is applied.

FIG. 10 is a cross section of fluid machinery, especially a francis turbine, whereon the weld padding layer of the present invention is applied. The main part of the turbine is composed of a runner, i.e. a moving blade, and the runner itself has a plurality of blades 3 formed between the crown 1 and the shroud 2, and the runner cone 104 which introduces water flow to the blade 3. The guide vane 5 and the stationary vane 6 are provided outside the blade 3. And the rotating wearing ring 7 and facing plate 8 are provided to the runner and the guide vane 5, respectively.

Figure 11:
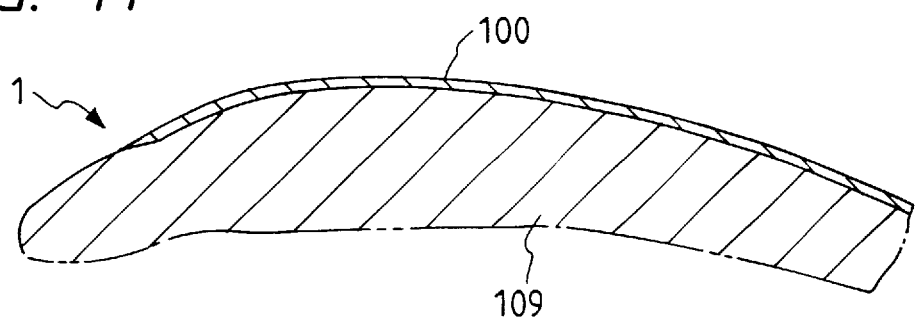
FIG. 11 is a cross section of a blade for explaining the use of the present invention to the fluid flow surface of the blade.

FIG. 11 is a cross section of the water flowing part of the blade 3 shown in FIG. 10 whereon the present invention is applied. The blade is composed of 5Ni13Cr cast steel of martensitic stainless steel, which is shown in Table 3 as Specimen No. 10, obtained by melting and casting. On the surface of the water flowing part of the blade where the damage by flowing water would be, the weld padding layer 100 was formed by coated arc welding. The weld padding layer was composed of an austenitic structure comprising C: 0.10–0.30% (by weight, all of the following elements), Si: max. 1%, Mn: max. 2%, Cr: 16.00–23.00%, Ni: 1.00–8.00%, Co: 2.00–9.00%, Mo: 0.50–5.00%, N:

0.05–0.20%, and residual: Fe and accompanied impurities. Especially, the weld padding layer having the composition of Specimen No. 4 in Table 3 was formed with the above mentioned thickness at counteracting planes to the flowing water.

The padding layer having the composition of the present invention formed by other surface treating methods such as TIG welding and powder welding rather than the coated arc welding had the same preferable characteristics as the present embodiment. Therefore, the padding layer can be formed by various surface treating methods. FIG. 11 indicates a case when the padding layer is formed directly onto the surface of the base metal. However, an intermediate layer can be formed between the base metal and the padding layer depending on the conditions.

Embodiment 3

Figure 12:
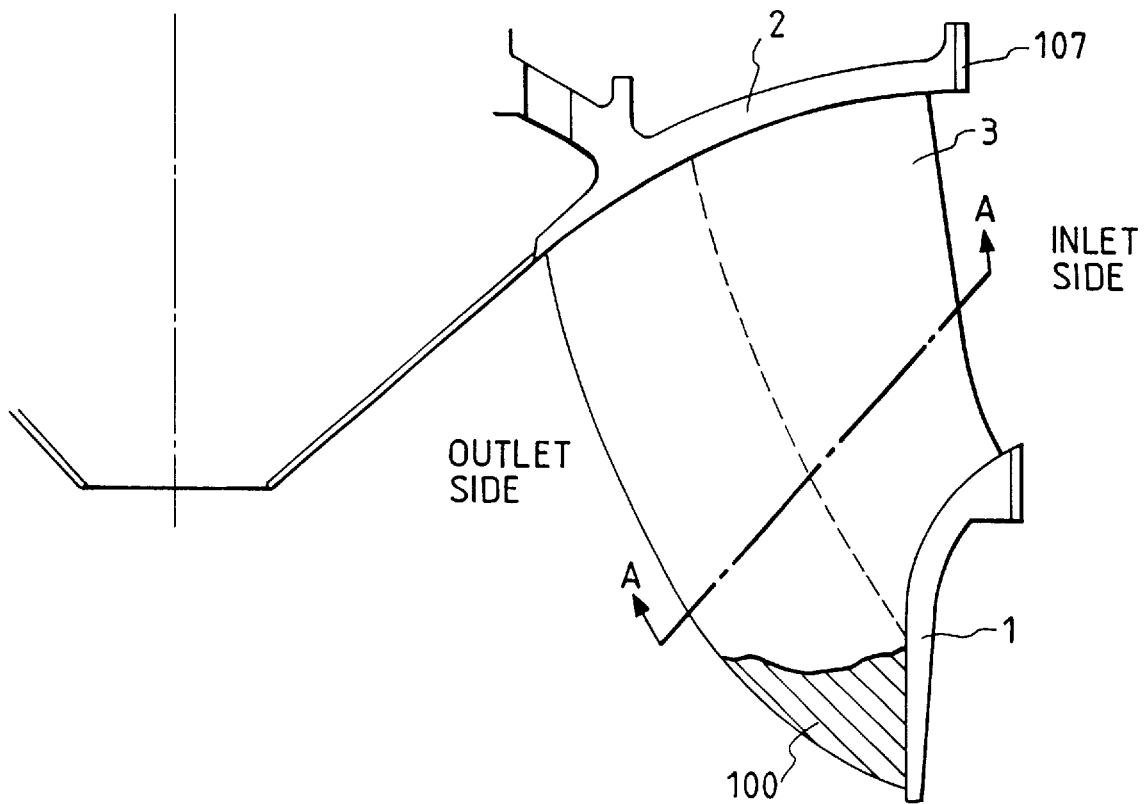
FIG. 12 is a partial plan view of a runner of a hydraulic turbine whereon the weld padding layer of the present invention is applied.
Figure 13:
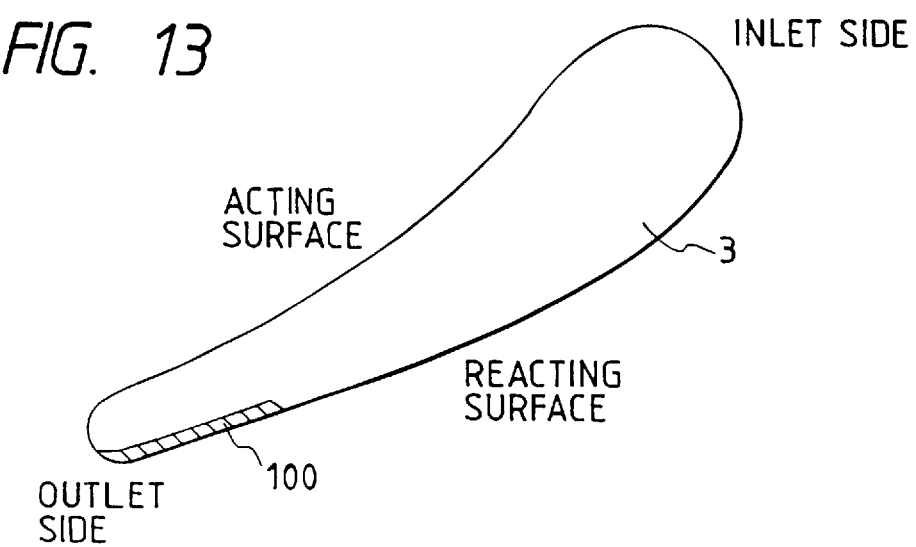
FIG. 13 is a cross sectional view taken substantially along the line A—A of FIG. 12.

FIG. 12 is a partial plan view of a runner of a hydraulic turbine indicating an applied portion of the padding layer formed with alloy powder relating to the present invention on a counteracting plane at the outlet side of the blade 3, and a partial cross section of the padding layer. FIG. 13 is a cross sectional view taken substantially along the line A—A of FIG. 12. The base metal 109 of the blade 3 is composed of 5Ni13Cr cast steel of martensitic stainless steel including residual austenitic phases, which is the low carbon material shown in Table 1, obtained by melting and casting the same as embodiment 1. On an area of about 600 mm×650 mm on the counteracting plane at the outlet side of the blade 3 shown in FIG. 13, a monolayer (3 mm thick) of the padding layer 100 was formed by plasma welding with alloy powder having 100–150 µm in particle size obtained from an alloy structure steel as shown in Table 3 as Specimen 3 by an atomizing method. The alloy powder comprised C: 0.29 (by weight, all of the following elements), Si: 0 31%, Mn: 1.25%, Ni: 2.25%, Cr: 22.44%, Co: 6.12%, Mo: 0.51%, and residual: Fe and accompanied impurities. After the welding, the padding layer was finished for flattening by cutting and eliminating the surface of the padding layer by about 1 mm. The welding was performed in a condition wherein the preheating temperature of the base metal was at room temperature (below 50° C.), and post heating after the welding was performed at 570°–590° C.

The hydraulic turbine having the above padding layer actually operated. As a result, it is revealed that the padding layer of the present invention has preferable cavitation resistance and erosion resistance, and longer period between repairing than that for conventional turbines, and consequently, is economically advantageous.

A process for forming a weld padding layer on the blade by powder plasma welding methods in the present invention is explained hereinafter.

Figure 14:
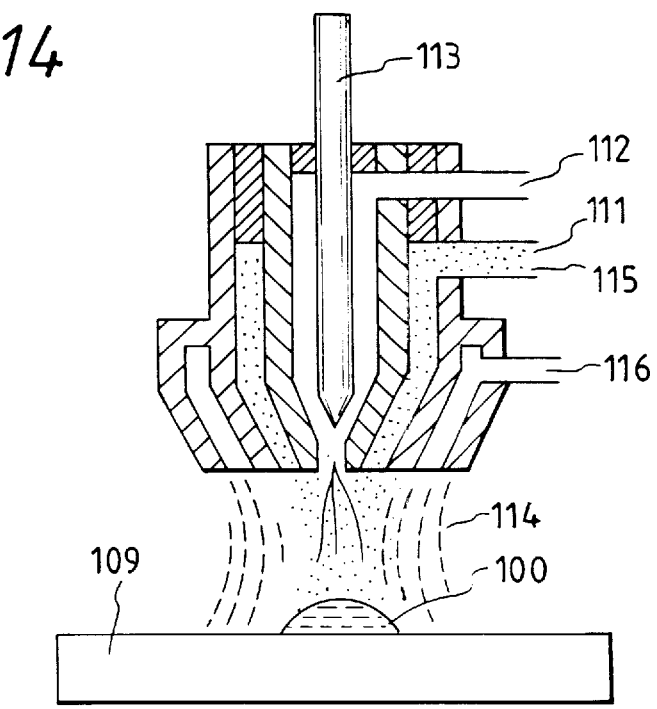
FIG. 14 is a schematic cross section of a welding torch for forming a padding layer by plasma welding.

FIG. 14 is a schematic cross section of a powder plasma welding apparatus for forming weld padding layers on the surface of the blade for flowing water with the alloy powder of the present invention. The alloy powder 111 is supplied to the above apparatus from a powder feeding apparatus, and is fused to form a padding layer 100 on the surface of the base metal 109. Concretely, an electric current is supplied between the electrode 113 and the base metal 109 in order to generate a pilot arc. Subsequently, shield gas (Ar gas) 116 is blown, an electric voltage is supplied between the electrode 113 an a the base metal 109 in order to generate a plasma arc 114, the alloy powder 111 from the powder feeding apparatus is supplied into the arc with the carrier gas 115, and the padding layer 100 is formed on the surface of the base metal 109 by melting the alloy powder 111 with the high temperature plasma. The welding condition to the counteracting plane at the outlet side of the blade was as follows, arc current; 220–240 A, arc voltage; 30–35 V, torch weaving width; 15 mm (15–16 cycles/min.), Ar gas supply (1/min.); for plasma 3, for carrier 5, and for shield 15.

In accordance with the present embodiment, preferable erosion resistance in addition to preferable base metal characteristics the same as embodiment 1 can be obtained.

In accordance with the present invention, preferable advantages can be obtained such as being provided with high quality products which are preferable for runners and guide vanes of pump generators having high heads of more than 400 m, preferably more than 500 m, with high strength, high toughness, and preferable weldability without preheating.

In accordance with the present invention, damage resistance of members for apparatus using fluid such as river water and sea water can be improved by forming padding layers of 3–20 mm thick previously or after damage at the surface area of the members made of 13 Cr steel containing Ni, which would be eroded especially by cavitation, by welding methods using welding materials such as welding rods and welding powders. The welding rod and the welding powder have an austenitic structure comprising C: 0.10–0.30% (by weight, all of the following elements), Si: max. 1%, Mn: max. 2%, Cr: 16.00–23.00%, Ni: 1.00–8.00%, Co: 2.00–9.00%, and Ni+Co: 6.00–12.00%, or further, including at least one of Mo: 0.50–5.00%, N: 0.05–0.20%, V; max. 0.50%, Ti: max. 0.50%, Nb: max. 0.50%, and W: max. 0.50%.

Therefore, various advantages such as decreasing erosion damage of the members caused by cavitation, improving life span of the members and efficiency of operation, extension of the interval for periodic replacement of the member, and lowering cost can be achieved.

What is claimed is:

1. An ultra high head pump turbine power generating plant comprising a turbine having a runner rotating with water flow supplied through a high head conducting tube, and a rotary electric machine rotating with rotation of said runner, wherein said head is equal to or more than 400 m, and said runner is equal to or more than 5 meters in diameter, wherein said head is in a range of 400–600 m, and said runner has characteristics of;

one of yield strength at room temperature: at least 500 N/mm$^2$; and tensile strength at room temperature: at least 650 N/mm$^2$;

elongation at least 16%;

reduction of area at least 45%;

2 mm U-notch impact value at 0° C. at least 100 J; and fracture toughness at least 6000 N/mm$^{3/2}$.

2. An ultra high head pump turbine power generating plant as claimed in claim 1, wherein said turbine is a pump for pumping up water through said conducting tube by said runner, and said runner is rotated by said rotary electric machine.

3. An ultra high head pump turbine power generating plant comprising a turbine having a runner rotating with water flow supplied through a high head conducting tube, and a rotary electric machine rotating with rotation of said runner, wherein said head is equal to or more than 400 m, and said runner is equal to or more than 5 meters in diameter, wherein said head is in a range from more than 600 m to 800 m, and said runner has characteristics of:

one of yield strength at room temperature: at least 530 N/mm$^2$; and tensile strength at room temperature: at least 700 N/mm$^2$;

elongation at least 16%;
reduction of area at least 50%;
2 mm U-notch impact value at 0° C. at least 100 J; and
fracture toughness at least 6000 N/mm$^{3/2}$.

4. An ultra high head pump turbine power generating plant as claimed in claim 3, wherein
said turbine is a pump for pumping up water through said conducting tube by said runner, and
said runner is rotated by said rotary electric machine.

5. An ultra high head pump turbine power generating plant comprising a turbine having a runner rotating with water flow supplied through a high head conducting tube, and a rotary electric machine rotating with rotation of said runner, wherein said head is equal to or more than 400 m, and said runner is equal to or more than 5 meters in diameter, wherein said head is in a range from more than 800 m to 1000 m, and said runner has characteristics of:
one of yield strength at room temperature: at least 560 N/mm$^2$; and
tensile strength at room temperature: at least 750 N/mm$^2$;
elongation at least 20%;
reduction of area at least 50%;
2 mm U-notch impact value at 0° C. at least 100 J; and
fracture toughness at least 6000 N/mm$^{3/2}$.

6. An ultra high head pump turbine power generating plant as claimed in claim 5, wherein
said turbine is a pump for pumping up water through said conducting tube by said runner, and
said runner is rotated by said rotary electric machine.

7. An ultra high head pump turbine power generating plant comprising a turbine having a runner rotating with water flow supplied through a high head conducting tube, and a rotary electric machine rotating with rotation of said runner, wherein said head is equal to or more than 400 m, wherein said head is in a range of 400–600 m, and said runner has characteristics of;
one of yield strength at room temperature: at least 500 N/mm$^2$; and
tensile strength at room temperature: at least 650 N/mm$^2$;
elongation at least 16%;
reduction of area at least 45%;
2 mm U-notch impact value at 0° C. at least 100 J; and
fracture toughness at least 6000 N/mm$^{3/2}$.

8. An ultra high head pump turbine power generating plant supplied through a high head conducting tube, and a rotary electric machine rotating with rotation of said runner, wherein said head is equal to or more than 400 m, wherein said head is in a range from more than 600 m to 800 m, and said runner has characteristics of:
one of yield strength at room temperature: at least 530 N/mm$^2$; and
tensile strength at room temperature: at least 700 N/mm$^2$;
elongation at least 16%;
reduction of area at least 50%;
2 mm U-notch impact value at 0° C. at least 100 J; and
fracture toughness at least 6000 N/mm$^{3/2}$.

9. An ultra high head pump turbine power generating plant comprising a turbine having a runner rotating with water flow supplied through a high head conducting tube, and a rotary electric machine rotating with rotation of said runner, wherein said head is equal to or more than 400 m, wherein said head is in a range from more than 800 m to 1000 m, and said runner has characteristics of:
one of yield strength at room temperature: at least 560 N/mm$^2$; and
tensile strength at room temperature: at least 750 N/mm$^2$;
elongation at least 20%;
reduction of area at least 50%;
2 mm U-notch impact value at 0° C. at least 100 J; and
fracture toughness at least 6000 N/mm$^{3/2}$.

10. An ultra high head pump turbine power generating plant comprising a turbine having a runner rotating with water flow supplied through a high head conducting tube, and a rotary electric machine rotating with rotation of said runner, wherein said head is equal to or more than 400 m, wherein said head is in a range of 400–600 m, and said runner comprising cast members made of stainless steel wherein the stainless steel is high toughness 13Cr5Ni group stainless steel comprising:
C: 0.008–0.030% (by weight, all of the following elements);
Si: max. 1%;
Mn: max. 2%;
Cr: 10.0–14.0%;
Ni: 4.0–7.00%; and
Mo: 0.2–2.0%; wherein the (Cr/Ni) ratio is in a range of 2.0–3.0.

11. An ultra high head pump turbine power generating plant comprising a turbine having a runner rotating with water flow supplied through a high head conducting tube, and a rotary electric machine rotating with rotation of said runner, wherein said head is equal to or more than 400 m, wherein said head is in a range of 400–600 m, and said runner comprising cast members made of stainless steel wherein the stainless steel is high toughness 13Cr5Ni group stainless steel comprising:
C: 0.008–0.03% (by weight, all of the following elements);
Si: max. 1%;
Mn: max. 2%;
Cr: 10.0–14.0%;
Ni: 4.0–7.0%; and
Mo: 0.2–2.0%; wherein the (C/Mo) ratio is in a range of 0.015–0.1.

12. An ultra high head pump turbine power generating plant comprising a turbine having a runner rotating with water flow supplied through a high head conducting tube, and a rotary electric machine rotating with rotation of said runner, wherein said head is equal to or more than 400 m, wherein said head is in a range from more than 600 m to 800 m, and said runner comprising cast members made of stainless steel wherein the stainless steel is high toughness 13Cr5Ni group stainless steel comprising:
C: 0.008–0.03% (by weight, all of the following elements);
Si: max. 1%;
Mn: max. 2;
Cr: 10.0–14.0%;
Ni: 4.0–7.00%; and
Mo: 0.2–2.0%; wherein the (Cr/Ni) ratio is in a range of 2.0–3.0.

13. An ultra high head pump turbine power generating plant comprising a turbine having a runner rotating with water flow supplied through a high head conducting tube, and a rotary electric machine rotating with rotation of said runner, wherein said head is equal to or more than 400 m, wherein said head is in a range from more than 600 m to 800 m, and said runner comprising cast members made of stainless steel wherein the stainless steel is high toughness 13Cr5Ni group stainless steel comprising:

C: 0.008–0.03% (by weight, all of the following elements);

Si: max. 1%;

Mn: max. 2%;

Cr: 10.0–14.0%;

Ni: 4.0–7.0%; and

Mo: 0.2–2.0%; wherein the (C/Mo) ratio is in a range of 0.015–0.1.

14. An ultra high head pump turbine power generating plant comprising a turbine having a runner rotating with water flow supplied through a high head conducting tube, and a rotary electric machine rotating with rotation of said runner, wherein said head is equal to or more than 400 m, wherein said head is in a range from more than 800 m to 1000 m, and said runner comprising cast members made of stainless steel wherein the stainless steel is high toughness 13Cr5Ni group stainless steel comprising:

C: 0.008–0.03% (by weight, all of the following elements);

Si: max. 1%;

Mn: max. 2%;

Cr: 10.0–14.0%;

Ni: 4.0–7.0%; and

Mo: 0.2–2.0%; wherein the (Cr/Ni) ratio is in a range of 2.0–3.0.

15. An ultra high head pump turbine power generating plant comprising a turbine having a runner rotating with water flow supplied through a high head conducting tube, and a rotary electric machine rotating with rotation of said runner, wherein said head is equal to or more than 400 m, wherein said head is in a range from more than 800 m to 1000 m, and said runner comprising cast members made of stainless steel wherein the stainless steel is high toughness 13Cr5Ni group stainless steel comprising:

C: 0.008–0.03% (by weight, all of the following elements);

Si: max. 1%;

Mn: max. 2%;

Cr: 10.0–14.0%;

Ni: 4.0–7.0%; and

Mo: 0.2–2.0%; wherein the (C/Mo) ratio is in a range of 0.015–0.1.

* * * * *